United States Patent
Kaur et al.

(10) Patent No.: US 11,652,772 B2
(45) Date of Patent: May 16, 2023

(54) DYNAMICALLY DETERMINING VISIBILITY OF A POST

(71) Applicant: KYNDRYL, INC., New York, NY (US)

(72) Inventors: Satvinder Kaur, New Delhi (IN); Seema Nagar, Bangalore (IN); Kuntal Dey, Vasant Kunj (IN); Prince Ravindran, Chennai (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/012,273

(22) Filed: Sep. 4, 2020

(65) Prior Publication Data

US 2022/0078146 A1    Mar. 10, 2022

(51) Int. Cl.
*H04L 51/216* (2022.01)
*H04L 51/043* (2022.01)
*H04L 51/42* (2022.01)
*H04L 51/52* (2022.01)
*H04L 51/212* (2022.01)

(52) U.S. Cl.
CPC .......... *H04L 51/216* (2022.05); *H04L 51/043* (2013.01); *H04L 51/212* (2022.05); *H04L 51/42* (2022.05); *H04L 51/52* (2022.05)

(58) Field of Classification Search
CPC ......... H04L 51/16; H04L 51/32; H04L 51/12; H04L 51/22
See application file for complete search history.

(56) References Cited

U.S. PATENT DOCUMENTS

| | | | |
|---|---|---|---|
| 7,594,258 B2 | 9/2009 | Mao | |
| 8,676,892 B2 | 3/2014 | Su | |
| 10,659,299 B1* | 5/2020 | Winters | H04L 67/12 |
| 2012/0110088 A1* | 5/2012 | Su | H04L 67/1044 709/205 |
| 2014/0130182 A1 | 5/2014 | Yackanich | |
| 2015/0269155 A1* | 9/2015 | Bastide | G06Q 50/01 707/723 |
| 2015/0339373 A1* | 11/2015 | Carlson | H04L 51/04 707/737 |
| 2017/0011472 A1 | 1/2017 | Kennon | |
| 2017/0220652 A1* | 8/2017 | Kazi | G06F 16/24578 |
| 2017/0242931 A1* | 8/2017 | Lewis | H04L 67/02 |
| 2017/0302613 A1* | 10/2017 | Imbrie | H04L 51/226 |

(Continued)

OTHER PUBLICATIONS

Cha, Crystal, "How to Moderate Comments on Facebook and Instagram", Sep. 14, 2018, 19 pages, <https://blog.brandbastion.com/2018-guide-on-how-to-moderate-comments-on-facebook>.

*Primary Examiner* — Suraj M Joshi
*Assistant Examiner* — Jaren Means
(74) *Attorney, Agent, or Firm* — Erik Swanson; Andrew M. Calderon; Calderon Safran & Cole, P.C.

(57) ABSTRACT

Embodiments of the present invention provide methods, computer program products, and systems. In response to receiving a message, embodiments of the present invention can determine a visibility metric associated with the received message. Embodiments of the present invention can then dynamically create a list of users able to interact with the message based on the determined visibility metric. Embodiments of the present invention can then perform an action based on the dynamically created list.

20 Claims, 5 Drawing Sheets

(56) References Cited

U.S. PATENT DOCUMENTS

| | | | |
|---|---|---|---|
| 2019/0087082 A1* | 3/2019 | Chaudhri | G06F 3/04842 |
| 2019/0109911 A1 | 4/2019 | Laliberte | |
| 2019/0163683 A1* | 5/2019 | Morris | G06F 16/24575 |
| 2019/0279522 A1 | 9/2019 | Jafari | |
| 2021/0058352 A1* | 2/2021 | Fogu | G06N 20/00 |

* cited by examiner

DYNAMICALLY DETERMINING VISIBILITY OF A POST

BACKGROUND

The present invention relates generally to messaging, and more particularly to determining visibility of a message on an electronic platform.

On a daily basis, in both personal and professional lives, people engage in multi-party message conversations using electronic message services, such as email. Typically, when responding to an email message, users can select a couple of options to select whom they send the message to.

In other circumstances, a user can use messaging service platforms that are publicly displayed (e.g., message boards, social media platforms, etc.). Messages can include one or more of a combination between text, audio, pictorial, and visual media. In these platforms, users can similarly select whom they respond to. Certain platforms allow users to interact with graphic icons that symbolizes an intended expression (e.g., a like or reaction expression).

SUMMARY

According to an aspect of the present invention, there is provided a computer-implemented method. The method comprises in response to receiving a message, determining a visibility metric associated with the received message; dynamically creating a list of users able to interact with the message based on the determined visibility metric; and performing an action based on the dynamically created list.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize that messaging platforms and usage of those messaging platforms has increased. Users can post a message for a number of purposes (e.g., to spread information, solicit feedback, etc.). Users can specify whether the posted message is private (e.g., not viewable to all members of a messaging platform), public (e.g., viewable to all members of the messaging platform), or can individually specify which users of the messaging platform can view the message (e.g., a whitelist of users such as a "close friends" list). Other users can interact with a message (e.g., posted to a messaging platform) in several ways. For example, a user may directly interact with a message by directly responding to it using one or more combinations of textual, audio, visual, pictorial, and/or a graphics interchange format (GIF)).

Embodiments of the present invention recognize the problems with current messaging platforms. Specifically, embodiments of the present invention recognize that the customization of privacy is limited and static As described above, messaging platforms can either make a blanket selection of private (e.g., not viewable to all members of a messaging platform), public (e.g., viewable to all members of the messaging platform), or can individually specify which users of the messaging platform can view the message (e.g., a whitelist of users such as a "close friends" list). As such, embodiments of the present invention provide solutions that increase customization of privacy settings by dynamically determining a visibility of a post (or response to a post) and taking appropriate action based on the determined visibility. For example, embodiments of the present invention can generate a user interface that is user specific and selectively obfuscates or reveals (i.e., shows) a post to either the original poster or other members viewing and/or responding to the message of the original poster based, at least in part on, a type of response, sentiment of a response, authenticity of an account associated with a user responding to a post, degree of connection of the account to the original poster, and frequency and number of interactions between the original poster and user responding. In this manner, as described in greater detail later in this Specification, embodiments of the present invention improve existing messaging platforms by providing dynamic determinations with respect to visibility of a post and subsequently generating one or more other different user interfaces unique to respective users based on the determined visibility of the post.

A "post", as used herein, refers to one or more combinations of content. Content can be textual, audio, visual, pictorial messages. The post can include any number of textual input inputted into a text field as well file extensions such as .doc, .docx, .odt, .pdf, .rtf.txt, .wpd, etc, Posts can further include audio (e.g., .m4a, .mp3, .mp4, .wave. wma, etc.) visual/image (e.g., .jpeg, .tiff, .bmp, .pdf, .gif etc.).

A "messaging platform" as used herein, refers to one or more electronic mediums that allow a user to share (i.e., post) messages. Messaging platforms can include one or more of message boards and social media platforms.

A user who begins a new thread or message containing content is referred to as an original poster. The message posted by the original poster can be referred to as the parent message Conversely any subsequent response or interaction with a parent message can be referred to as a child message. A child message can become a parent message when subsequent users respond to or otherwise interact with the child message and not the original message (i.e., post) of the original poster.

Figure 1:
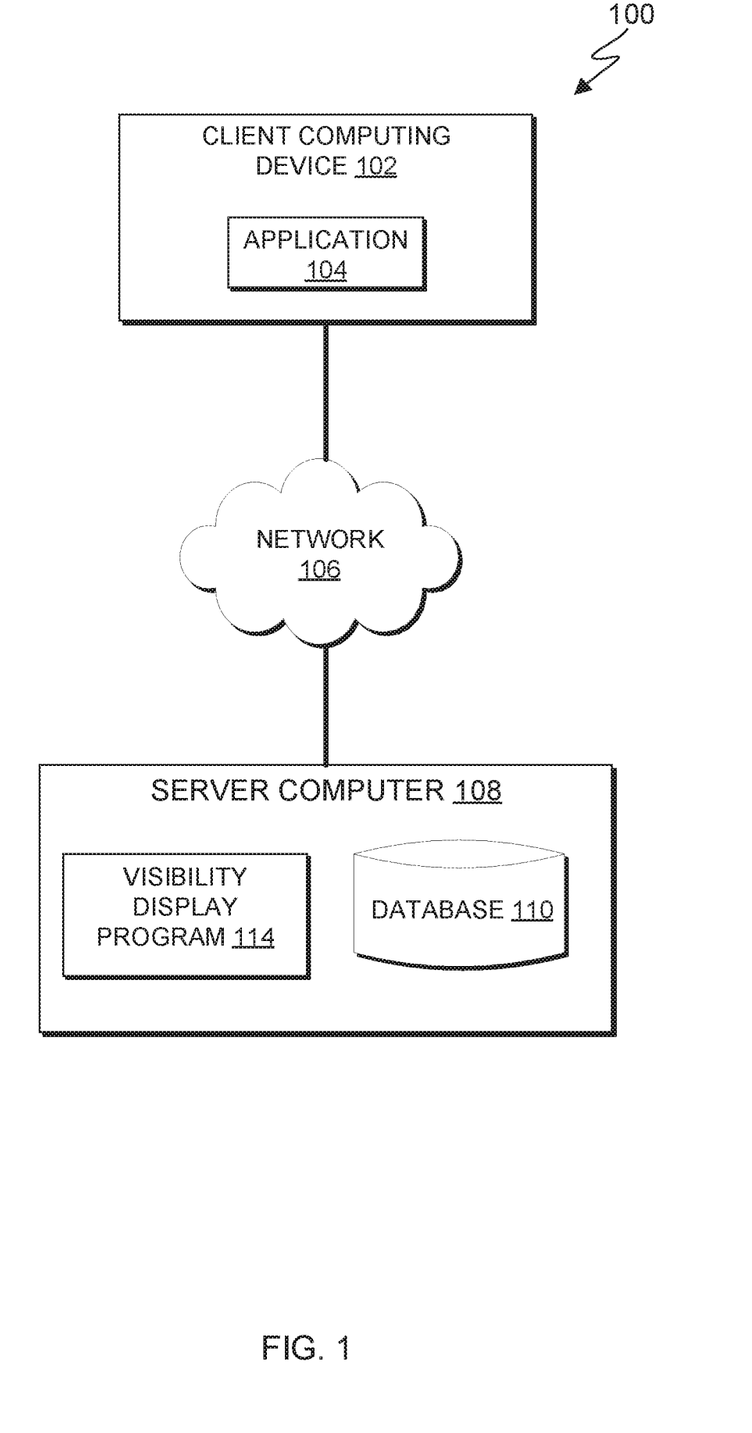
FIG. 1 depicts a block diagram of a computing system, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 5.

In this embodiment, client computing device 102 is a user device associated with a user and includes application 104. Application 104 communicates with server computer 108 to access visibility display program 114 (e.g., using TCP/IP) to access content, user information, and database information. Application 104 can further communicate with visibility display program 114 to transmit instructions to dynamically determine a visibility of a post and take action based on a determined visibility of a post as discussed in greater detail with regard to FIGS. 2-4.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts visibility display program 114 and database 110. In some embodiments server computer 108 can include a virtual database frame (not shown). In this embodiment, visibility display program 114 resides on server computer 108. In other embodiments, visibility display program 114 can have an instance of the program (not shown) stored locally on client computer device 102. In yet other embodiments, visibility display program 114 can be stored on any number or computing devices.

In this embodiment, visibility display program 114 provides an increased level of privacy by dynamically determining a visibility of a post and taking action based on a determined visibility of the post. In this embodiment, visibility display program 114 includes a rules module (not shown), analyzer module (not shown), and determination module (not shown) that are leveraged by visibility display program 114 to dynamically determine a visibility of a post and take appropriate action based on the determined visibility of the post as described in greater detail with regard to FIGS. 2-4.

Figure 3:
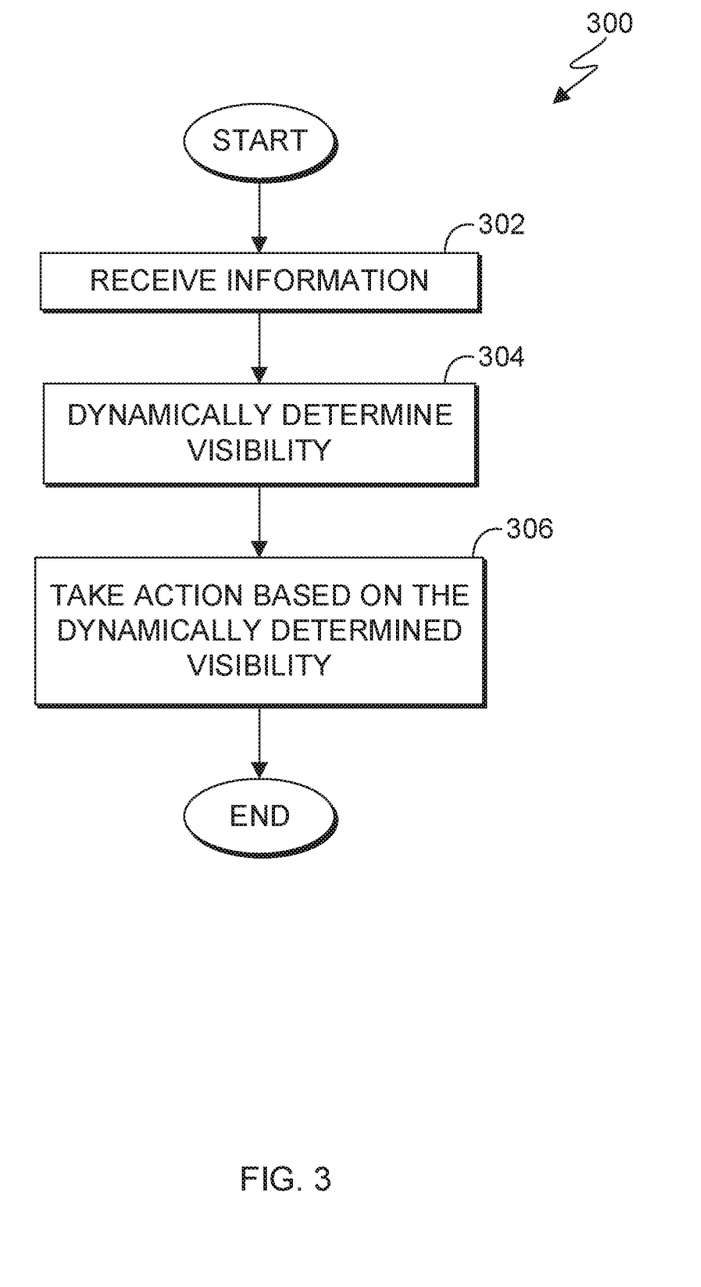
FIG. 3 is a flowchart depicting operational steps for taking action based on a determined visibility of a post, in accordance with an embodiment of the present invention
Figure 4:
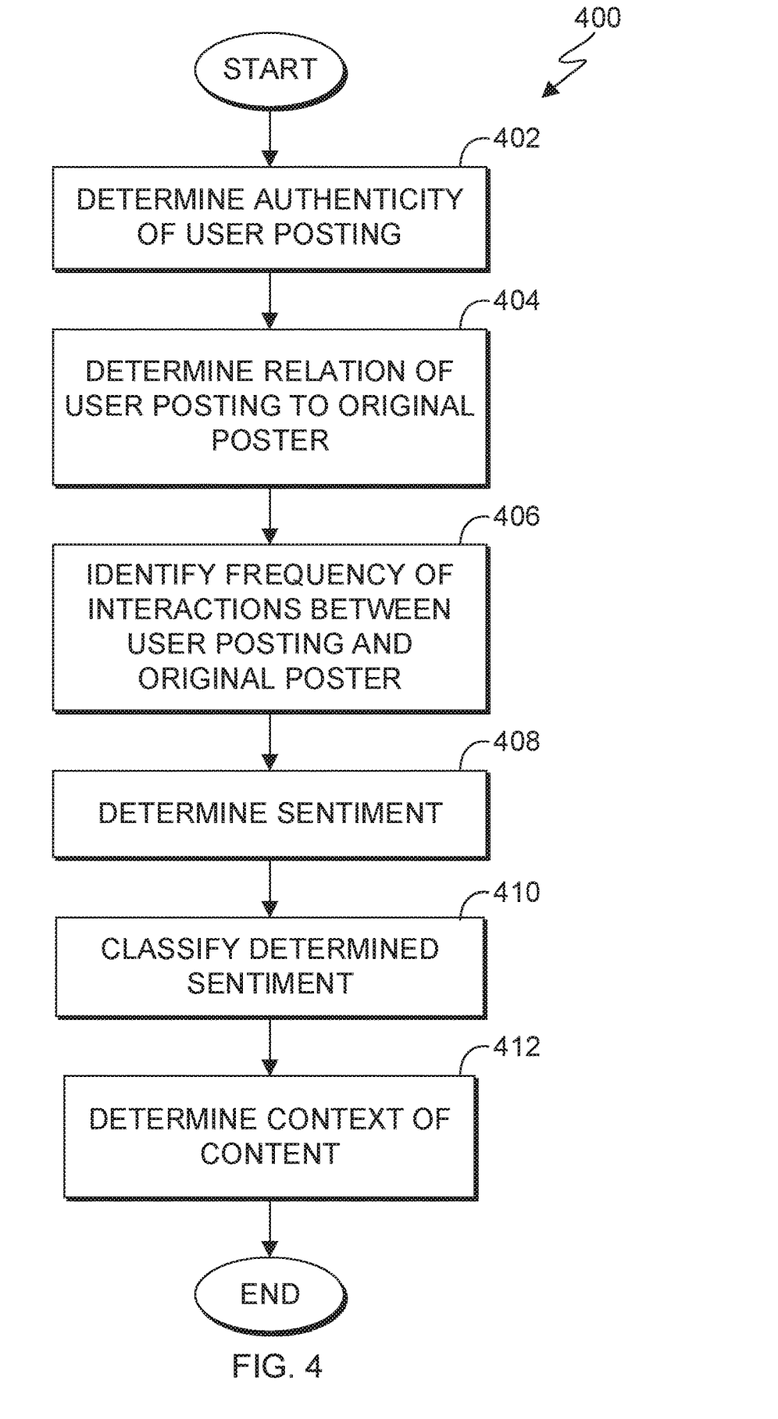
FIG. 4 is a flowchart depicting operational steps for dynamically determining a visibility of a post, in accordance with an embodiment of the present invention.

In this embodiment, visibility display program 114 dynamically determines a visibility of a post by considering a type of response, sentiment of a response, authenticity of an account associated with a user responding to a post, degree of connection of the account to the original poster, and frequency of interactions between the original poster and user responding as described in greater detail with respect to FIGS. 3 and 4.

In this embodiment, a visibility of the post can be configurable to any user-defined criteria. For example, visibility display program 114 can automatically add more granularity for viewing options based on the determined visibility of the post. The visibility of the post can range from public (i.e., viewable to all members of the messaging platform), private, (i.e., not viewable to any members of the messaging platform), and a dynamically created list of members that are able to view the post.

A dynamically created list of members that are able to view the post can include a list of individuals that cannot view the original post. The dynamically created list of members can also serve as a mechanism that can limit interaction of subsequent users to the original post as well as limit interaction between a subsequent user and other subsequent users. For example, visibility display program 114 can identify a new message as Message 1, associated with User A. Visibility display program 114 can then identify that a subsequent message, Message 2, associated with user B responds to Message 1. Visibility display program 114 can then dynamically determine a context associated with Message 2 as being unacceptable for viewing to either User A or other members of the messaging platform. In this scenario, visibility display program 114 can then obfuscate i.e., hide or otherwise not show (by generating a user interface viewable to subsequent users), Message 2 to either User A or subsequent users (e.g., a different user, User C, upon interacting with Message 1 can not view or otherwise is aware of Message 2 and its respective user, i.e., User B). In other embodiments, visibility display program 114 can generate a user interface that allows User C to see that User 2 has interacted with Message 1 but not does not allow User C to see the content of Message 2.

In this embodiment, database 112 can include one or more databases that function as a repository for stored information. In this embodiment, information can include information used for sentiment detection, social media user information, and learned rules. In some embodiments, database 110 can function as a repository for one or more files containing user information and preferences. In this embodiment, database 110 is stored on server computer 108 however, database 110 can be stored on a combination of other computing devices (not shown) and/or one or more components of computing environment 100 (e.g., client computing device 102) and/or other databases that has given permission access to visibility display program 114.

In general, database 110 can be implemented using any non-volatile storage media known in the art. For example, database 110 can be implemented with a tape library, optical library, one or more independent hard disk drives, or multiple hard disk drives in a redundant array of independent disk (RAID). In this embodiment database 110 is stored on server computer 108.

Figure 2:
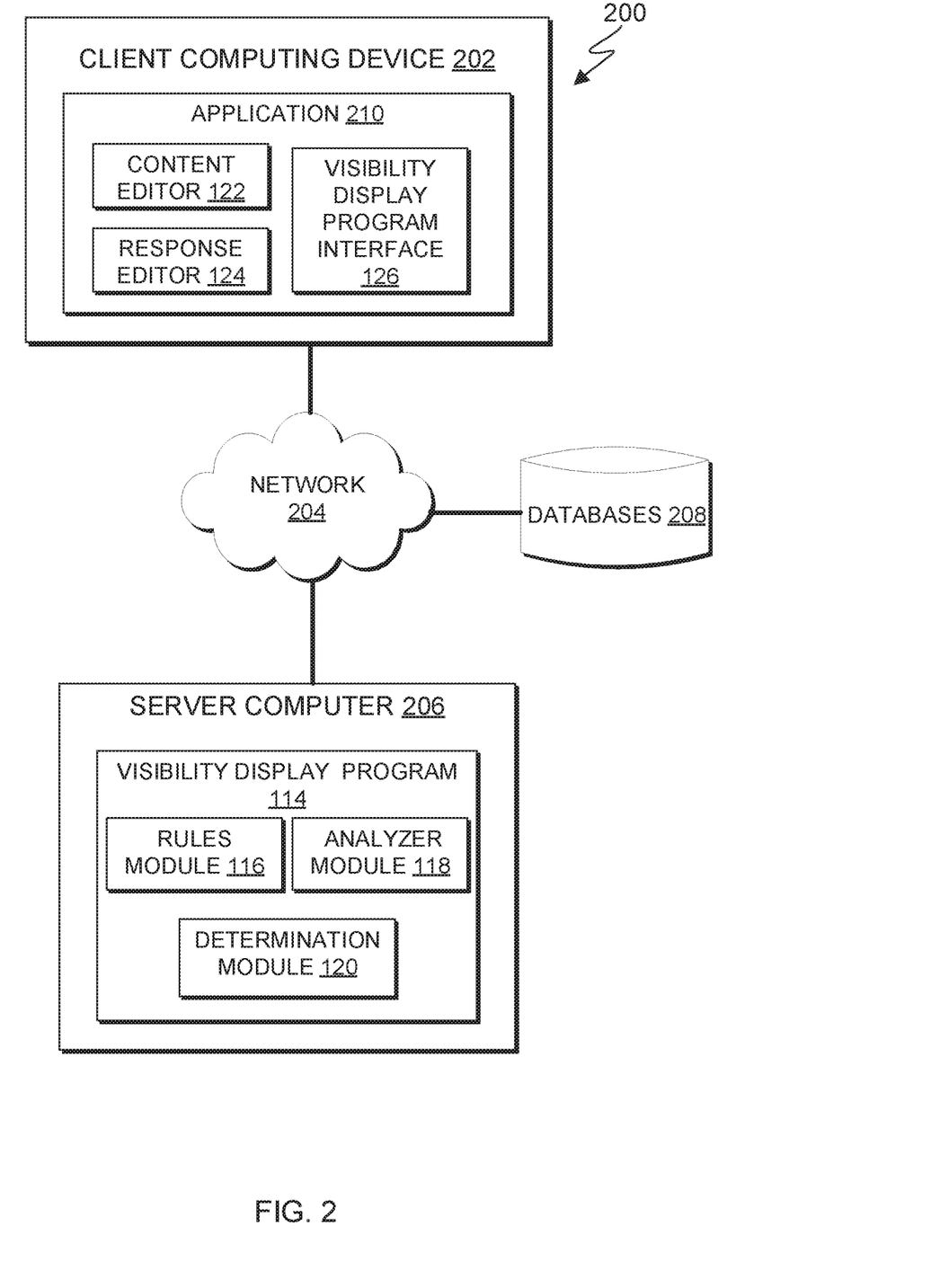
FIG. 2 depicts an alternate block diagram of a computing system, in accordance with an embodiment of the present invention.

FIG. 2 depicts an alternate block diagram of a computing system, in accordance with an embodiment of the present invention.

Computing environment 200 includes client computing device 202 and server computer 206, all interconnected over network 204. Client computing device 202 and server computer 206 and network 204 are identical to and function in an equivalent manner to client computing device 102, server computer 108, and network 106 of FIG. 1.

Client computing device 202 includes application 104. In general, application 210 is another instance of and functions operatively in the same manner as application 104 as described in FIG. 1. In this embodiment, application 210 includes content editor 122, response editor 124, and visibility display program interface 126.

Content editor 122 refers to one or more programs that can create, edit, or otherwise modify a post. Response editor 124 can facilitate implementing actions based on determinations of visibility made by visibility display program 114. For example, response editor 124 can generate a user interface that is user specific and selectively obfuscates or reveals (i.e., shows) a post to either the original poster or other members viewing and/or responding to the message of the original poster.

In this embodiment, visibility display program interface 126 is a user interface that can communicate with visibility display program 114. In general, visibility display program interface 126 can be implemented using a browser and web portal or any program that transmits information to and receives information from, server computer 206.

Server computer 206 includes visibility display program 114. In this embodiment, visibility display program 114 includes rules module 116, analyzer module 118, and determination module 120.

Rules module 116 functions as a repository for created and otherwise learned rules. In this embodiment, a rule can include specified directions of a user to obfuscate a message and alter a user interface display such that the display prevents subsequent users from interacting with either the original message or messages from other users. For example, rules module 116 can include instructions to always obfuscate messages from a particular user.

Rules module 116 can, in some embodiments learn new rules based on past behavior using one or more combinations of machine learning and artificial intelligence algorithms. For example, rules module 116 can generate a rule to always obfuscate messages from a particular user based on the original user (e.g., original poster) always selecting to obfuscate content posted by the particular user.

Analyzer module 118 analyzes posts and responses to posts. In this embodiment, analyzer module 118 can use a combination of one or more machine learning and artificial intelligence to analyze content and responses to content (e.g., response to posts). For example, analyzer module 118 can use natural language annotations (e.g., sentence splitting, tokenization, POS tagging, chunking, dependency parsing, and anaphora resolution, etc.) to process the semantics of the text. Analyzer module 118 can then leverage sentiment information to match an analyzed post to known sentiments.

Determination module 120 determines a visibility of the post and subsequent actions to take using outputs of rules module 116 and analyzer module 118. In this embodiment, determination module 120 determines a visibility of the post and subsequent actions to take based on a type of response, sentiment of a response, authenticity of an account associated with a user responding to a post, degree of connection of the account to the original poster, and frequency and number of interactions between the original poster and user responding, as described in greater detail with respect to FIG. 4.

Databases 208 functions in a similar manner to databases 110 as described in FIG. 1. In this embodiment, databases 208 include one or more databases that stores information for sentiment detection (e.g., information used to train and classify sentiments associated with content being posted). Databases 208 can also include social media user information (e.g., members of a messaging platform that have granted access to visibility display program 114). Social media user information can also include one or more relationships of the user to other users. In some circumstances, social media user information can also include a frequency or amount of interactions a user has with other users of the messaging platform.

FIG. 3 is a flowchart 300 depicting operational steps for taking action based on a determined visibility of a post, in accordance with an embodiment of the present invention, in accordance with an embodiment of the present invention.

In step 302, visibility display program 114 receives information. In this embodiment, visibility display program 114 receives a request from client computing device 102. In other embodiments, visibility display program 114 can receive information from one or more other components of computing environment 100.

In this embodiment, information can include an original post that includes content and one or more subsequent responses to the original post in real time. Information can also include user preferences (e.g., specified privacy settings, stored privacy rules, etc.). Information can further include one or more completed threads (e.g., a parent and subsequent child messages that may not be active)

In step 304, visibility display program 114 dynamically determines visibility of a post. In this embodiment, visibility display program 114 determines a visibility of the post and subsequent actions to take based on a type of response, sentiment of a response, authenticity of an account associated with a user responding to a post, degree of connection of the account to the original poster, and frequency and number of interactions between the original poster and user responding, as described in greater detail with respect to FIG. 4. For example, visibility display program 114 can use the determined visibility to dynamically create list of members that are able to view the post can include a list of individuals that cannot view the original post based on the factors mentioned above.

In step 306, visibility display program 114 takes action based on the dynamically determined visibility. In this embodiment, visibility display program 114 takes action by utilizing the dynamically created list of members (based on the determined visibility of the post) to generate user interfaces (e.g., one or more interfaces specific to identified users) that limit interaction of subsequent users to the original post as well as limit interaction between a subsequent user and other subsequent users For example, visibility display program 114 can identify a new message as Message 1, associated with User A. Visibility display program 114 can then identify that a subsequent message, Message 2, associated with user B responds to Message 1. Visibility display program 114 can then dynamically determine a context associated with Message 2 as being unacceptable for viewing to either User A or other members of the messaging platform. In this scenario, visibility display program 114 can then obfuscate i.e., hide or otherwise not show (by generating a user interface viewable to subsequent users), Message 2 to either User A or subsequent users (e.g., a different user, User C, upon interacting with Message 1 cannot view or otherwise is aware of Message 2 and its respective user, i.e., User B).

Visibility display program 114 can further limit interactions between users interacting with a post. Continuing the above example, visibility display program 114 can generate a user interface that allows User C to see that User 2 has interacted with Message 1 but not does not allow User C to see the content of Message 2. Conversely, viability display program 114 can identify that the visibility of User C's post, Message 3, should not be made viewable to User B. Accordingly, visibility display program 114 can create a display for User B, that, when viewed by User B can show User C as responding to the original message, Message 1, but does not display the content of Message 3.

In this example, however, the original poster of Message 1 can see both User B and User C's responses. By obfuscating User B's response from User C (and vice versa), visibility display program 114 can limit interactions between subsequent users responding to the original message and interactions between other subsequent users.

Continuing the example from above, visibility program 114 can receive a request from User D to interact with Message 1. In this example, visibility program 114 determines that visibility with respect to User B and User C's responses (e.g., Message 2 and Message 3, respectively) can be viewable to User D. Accordingly, visibility program 114 can generate a display that renders viewable Messages 1, 2, and 3 to User D.

Visibility display program 114 can offer further granularity by determining that visibility or interaction with User C should be limited based on an analysis of the content of User C's and User D's message. As such, visibility display program 114 can modify the generated user interface for User D to remove a graphic interface icon that, when selected by User D, allow User D to respond to User C. In this manner, visibility display program 114 can further limit interactions between subsequent users responding to an original post.

FIG. 4 is a flowchart depicting operational steps for dynamically determining a visibility of a post, in accordance with an embodiment of the present invention In step 402, visibility display program 114 determines authenticity of a user posting. In this embodiment, visibility display program 114 determines authenticity of a user posting by leveraging an existing messaging platform's verification procedure. For example, visibility display program 114 can query an existing messaging platform service to identify whether the user has passed the messaging platforms verification procedure.

In some embodiments, visibility display program 114 can identify authenticity of a user by identifying a graphical icon that represents authenticity. For example, visibility display program 114 can access a messaging platform and identify, from the user's name (displayed on a webpage), that the user's name includes a graphical icon denoting the user as a real user (e.g., a blue checkmark next to the user's name) as opposed to a bot.

In certain other embodiments, visibility display program 114 can access one or more other databases to verify the user's profile against other created user profiles that match the user profiles description. For example, visibility display program 114 can verify user alpha as a "real" user by looking up accounts sharing user alphas email address on other messaging platforms. Visibility display program 114 can optionally cross reference the other accounts to identify a length of time reflecting ownership of those respective accounts. For example, a new account, created only moments before posting a response could reflect an inauthentic user.

In instances where visibility display program 114 does not or cannot verify the user responding to the original post (and thereby the original poster), visibility display program 114 can automatically hide the post (i.e., content) made by the unverified user. In certain embodiments, visibility display program 114 can transmit a notification to the user associated with the original post detailing the content responding to the original post. In instances where visibility display program 114 verifies the user responding to the original post, processing continues at step 404.

In step 404, visibility display program 114 determines relation of the user responding to the original poster. In this embodiment visibility display program 114, determines the relation of the user posting content responding to the original poster by accessing a respective messaging service platform that both users are using and cross referencing whether the original poster has chosen to affiliate himself or herself with the person responding (e.g., whether the original poster and the user responding are "friends").

In certain embodiments where visibility display program 114 determines that the user responding does not have a relationship with the user, visibility display program 114 can take action. In this embodiment, an action can include transmit a notification to the user associated with the original post detailing the content responding to the original post. An action can also include a notification to the user responding to the original post that the user associated with the original post has security features enabled that prevent immediate publication (i.e., post) of the response.

In embodiments where visibility display program 114 determines that the user responding has a relationship with the user, processing continues to step 406.

In step 406, visibility display program 114 identifies frequency of interactions between the user responding and the original poster. In this embodiment, visibility display program 114 identifies frequency of interactions between the user responding and the original poster by crawling through respective pages of each user hosted on the messaging platform service. Visibility display program 114 can then identify each message sent between each user and accordingly tally (i.e., sum) the total number of interactions.

In step 408, visibility display program 114 determines a sentiment associated with content associated with the response of the user. In this embodiment, visibility display program 114 determines a sentiment by leveraging one or more sentiment analysis modules. In this embodiment, a sentiment can be defined as being one of three categories, positive, neutral, and negative. A positive sentiment can denote expression of happiness and support. Conversely, a negative sentiment can denote unhappiness, anger, and resentment. A neutral sentiment can denote an expression that neither classifies as positive or negative.

In step 410, visibility display program 114 classifies the determined sentiment. In this embodiment, visibility display program 114 classifies the determined sentiment by analyzing the context associated with the content. In this embodiment, visibility display program 114 can classify the determine sentiment as being motivational, related to a policy, etc.

In step 412, visibility display program 114 determines the context of the content based on the sentiment classification. In this embodiment, visibility display program 114 determines the context of the content using one or more analyzer modules.

In some embodiments, visibility display program 114 can then assign weighted values to each output of the preceding steps to determine a visibility score (e.g., a visibility metric). In this embodiment, a numeric scale is used where higher numbers indicate a greater value. Conversely, lower numbers indicate a lesser value. For example, using a numeric scale of one through ten, a score of seven would be considered a higher score than a value of two.

In this embodiment, several threshold values are used to dynamically determine and subsequently create lists of individuals that are allowed visibility to a message. In this embodiment, scores ranging from zero to three are made viewable only to the original poster. A score ranging from four to six allows visibility display program 114 to publish or otherwise make viewable the content of the message to be made viewable to users having an established (i.e., existing) relation with the original poster (e.g., is on the user's friends list). Scores ranging from seven to ten can optionally be made viewable to all members of the messaging platform or to users having an existing relation to the original poster.

In an example, visibility display program 114 can identify authenticity of a user responding and assign that finding a value of one. Visibility display program 114 can determine that the verified user also has a relation to the original poster and assign that finding a value of one. Visibility display program 114 can identify there have been five previous interactions between the users and assign that a value of five (e.g., proportional to the number of interactions). Visibility display program 114 can then determine that the sentiment is negative and assign that a value of negative one. Visibility display program 114 can then determine the context of the content as being an opinion and assign that value of zero for being neutral. Visibility display program 114 can then add the assigned values (e.g., 1+1+5+(−1)+1+0) to get a score of seven. In this example, a threshold score of seven is required to be met to generate a security rule that specifies that the post made by the user can be published and made viewable to the original poster and all viewers (i.e., members) of the messaging platform. Accordingly, visibility display program 114 can then generate a user interface that allows all members of the messaging platform to view the response and content associated with the response.

In certain embodiments, visibility display program 114 can calculate and assign weighted values to messages between users interacting with the original post and dynamically determine whether subsequent users can interact with each other. For example, User alpha could post an original post. User beta could respond to the original post. Visibility display program 114 can determine that User beta's response can be published and made viewable to users having an existing relation to User alpha. User gamma responds to User beta but visibility display program 114 determines that the score is one. Visibility display program 114 can then generate a user interface that allows User beta to see that User gamma has responded but obfuscates content of the message. Optionally, visibility display program 114 can generate a user interface for User beta that does not show that User gamma has responded to User beta. In either circumstance, visibility display program 114 can generate a notification to the original poster (e.g., User alpha) of its determination and allow User alpha to modify the generated display.

Optionally, continuing the example above, visibility display program 114 can also generate a notification to User gamma to notify User gamma that the message responding to User beta has not been published to a page belonging to User alpha. Visibility display program 114 can, in some circumstances, specify a reason as to why visibility display program 114 did not publish the message.

In other embodiments, visibility display program 114 can be configured to obfuscate messages in response to the original post in a sequential manner. For example, User alpha can specify a rule that prefers User gamma to not see the response posted by User beta until User gamma has responded already. Visibility display program 114 can store this created rule and apply it in future scenarios.

In yet other embodiments, visibility display program 114 can dynamically create lists (and rules) based on previous interactions, regardless of the assigned weights. For example, if User alpha has deleted posts from User beta five times, then visibility display program 114 can create a list comprising User beta and associated rule that messages from User beta will not displayed on pages of User alpha.

Figure 5:
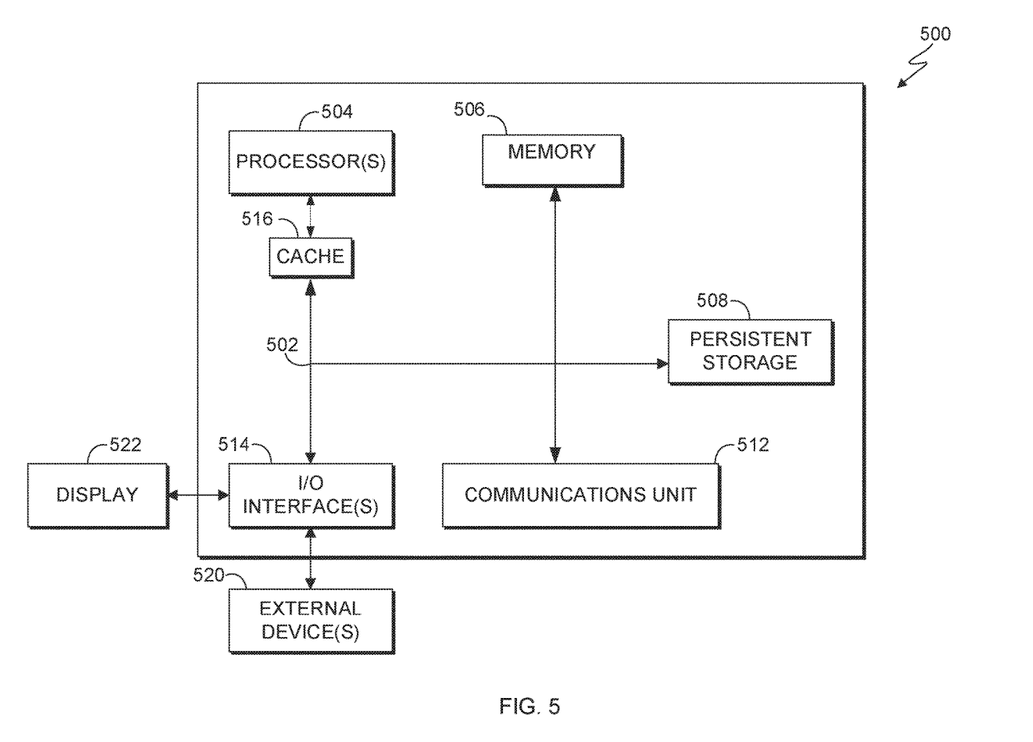
FIG. 5 is a block diagram of an example system, in accordance with an embodiment of the present invention.

FIG. 5 depicts a block diagram of components of computing systems within computing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 500 includes communications fabric 502, which provides communications between cache 516, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Visibility display program 114 (not shown) may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 510 may provide communications through the use of either or both physical and wireless communications links. Visibility display program 114 may be downloaded to persistent storage 508 through communications unit 512.

I/O interface(s) 514 allows for input and output of data with other devices that may be connected to client computing device and/or server computer. For example, I/O interface 514 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards. Software and data used to practice embodiments of the present invention, e.g., visibility display program 114, can be stored on such portable computer readable storage media and can be loaded onto persistent storage 508 via I/O interface(s) 514. I/O interface(s) 514 also connect to a display 522.

Display 522 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   in response to receiving a message that responds to a previous message, determining a visibility metric associated with the received message, the visibility metric comprising a visibility score including a summation of a first numeric value based on an authenticity of a user associated with the message, the authenticity of the user being determined by matching a user profile of the user against other user profiles that match a user profile description and cross referencing the other user profiles to identify a length of time of ownership, a second numeric value which is proportional to a number of interactions between the user associated with the message, an original poster associated with the previous message, and subsequent users based associated with the message, the number of interactions being determined by identifying a frequency of interactions between the user, the original poster, and subsequent users on a messaging platform, and a third numeric value based on a sentiment associated with the message, the sentiment being determined by whether the message is a first expression of happiness or support, a second expression of unhappiness, anger, or resentment, or a third expression which is different from the first expression and the second expression;
   allowing only the original poster associated with the previous message to view the message in response to the visibility score being below a first predetermined threshold visibility score;
   allowing all users to view the message in response to the visibility scoring being above a second predetermined threshold visibility score which is greater than the first predetermined threshold visibility;
   allowing only users having an existing relation to the original poster to view the message in response to the visibility scoring being between the first predetermined threshold visibility score and the second predetermined threshold visibility score;
   dynamically creating a list of users able to interact with the message based on the determined visibility metric; and
   generating one or more user interfaces unique to respective subsequent users based on the dynamically created list of members and the original poster associated with the previous message that, when viewed by each of the respective subsequent users, limit interaction of the respective subsequent users to the message and the original poster associated with the previous message, wherein each of the generated one or more user interfaces selectively obfuscates or reveals portions of the message, and each of the generated one or more user interfaces prevents particular subsequent users of the respective subsequent users from interacting with messages from other users and prevents the original poster associated with the previous message from interacting with the message.

2. The computer-implemented method of claim 1, wherein determining the visibility metric associated with the received message comprises:
   determining a relation of the user to an originating user.

3. The computer-implemented method of claim 2, further comprising:
   classifying the determined sentiment; and
   determining a context associated with the determined sentiment.

4. The computer-implemented method of claim 3, further comprising:
   determining the visibility metric based on assigned weighted values assigned to each determination.

5. The computer-implemented method of claim 1, further comprising:
   limiting interactions between a subsequent user and other subsequent users based on the determined visibility metric.

6. The computer-implemented method of claim 5, further comprising:
   transmitting a notification to a user of the previous message that includes information detailing interaction features of the one or more generated user interfaces.

7. The computer-implemented method of claim 1, wherein the previous message comprises an original post that includes privacy settings and privacy rules.

8. The computer-implemented method of claim 7, wherein the one or more interfaces comprise a plurality of user interfaces, and each of the user interfaces correspond to specific users.

9. The computer-implemented method of claim 8, wherein the visibility metric is based on a type of the message, sentiment of the message, authenticity of an account associated with the user associated with the message, degree of a connection to the original poster, and frequency and number of interactions between the original poster and the user associated with the message.

10. A computer program product comprising:
    one or more computer readable storage media and program instructions stored on the one or more computer readable storage media, the program instructions comprising:
    program instructions to, in response to receiving a message that responds to a previous message, determine a visibility metric associated with the received message, the visibility metric comprising a visibility score including a summation of a first numeric value based on an authenticity of a user associated with the message, the authenticity of the user being determined by matching a user profile of the user against other user profiles that match a user profile description and cross referencing the other user profiles to identify a length of time of ownership, and a second numeric value which is proportional to a number of interactions between the user associated with the message, an original poster associated with the previous message, and subsequent users based associated with the message, the number of interactions being determined by identifying a frequency of interactions between the user, the original poster, and subsequent users on a messaging platform;

program instructions to allow only the original poster associated with the previous message to view the message in response to the visibility score being below a first predetermined threshold visibility score;

program instructions to allow all users to view the message in response to the visibility scoring being above a second predetermined threshold visibility score which is greater than the first predetermined threshold visibility;

program instructions to allow only users having an existing relation to the original poster to view the message in response to the visibility scoring being between the first predetermined threshold visibility score and the second predetermined threshold visibility score:

program instructions to dynamically create a list of users able to interact with the message based on the determined visibility metric; and program instructions to generate one or more user interfaces unique to respective subsequent users based on the dynamically created list of members and the original poster associated with the previous message that, when viewed by each of the respective subsequent users, limit interaction of the respective subsequent users to the message and the original poster associated with the previous message, wherein each of the generated one or more user interfaces selectively obfuscates or reveals portions of the message, and each of the generated one or more user interfaces prevents particular subsequent users of the respective subsequent users from interacting with messages from other users and prevents the original poster associated with the previous message from interacting with the message, wherein the previous message comprises an original post that includes privacy settings and privacy rules.

11. The computer program product of claim 10, wherein the program instructions to determine the visibility metric associated with the received message comprise:
program instructions to determine a relation of the user to an originating user; and.

12. The computer program product of claim 11, wherein the program instructions stored on the one or more computer readable storage media further comprise:
program instructions to determine a sentiment associated with the message;
program instructions to classify the determined sentiment; and program instructions to determine a context associated with the determined sentiment.

13. The computer program product of claim 12, wherein the program instructions stored on the one or more computer readable storage media further comprise:
program instructions to determine the visibility metric based on assigned weighted values assigned to each determination.

14. The computer program product of claim 10, wherein the program instructions stored on the one or more computer readable storage media further comprise:
program instructions to limit interactions between a subsequent user and other subsequent users based on the determined visibility metric.

15. The computer program product of claim 14, wherein the program instructions stored on the one or more computer readable storage media further comprise:
program instructions to transmit a notification to a user of the previous message that includes information detailing interaction features of the one or more generated user interfaces.

16. A computer system for comprising:
one or more computer processors;
one or more computer readable storage media; and
program instructions stored on the one or more computer readable storage media for execution by at least one of the one or more computer processors, the program instructions comprising:

program instructions to, in response to receiving a message that responds to a previous message, determine a visibility metric associated with the received message, the visibility metric comprising a visibility score including a numeric value based on an authenticity of a user associated with the message, the authenticity of the user being determined by matching a user profile of the user against other user profiles that match a user profile description and cross referencing the other user profiles to identify a length of time of ownership;

program instructions to allow only an original poster associated with the previous message to view the message in response to the visibility score being below a first predetermined threshold visibility score;

program instructions to allow all users to view the message in response to the visibility scoring being above a second predetermined threshold visibility score which is greater than the first predetermined threshold visibility;

program instructions to allow only users having an existing relation to the original poster to view the message in response to the visibility scoring being between the first predetermined threshold visibility score and the second predetermined threshold visibility score:

program instructions to dynamically create a list of users able to interact with the message based on the determined visibility metric; and program instructions to generate one or more user interfaces unique to respective subsequent users based on the dynamically created list of members and the original poster associated with the previous message that, when viewed by each of the respective subsequent users, limit interaction of subsequent users to the message and the original poster associated with the previous message, wherein:

each of the generated one or more user interfaces selectively obfuscates or reveals portions of the message, each of the generated one or more user interfaces prevents particular subsequent users of the respective subsequent users from interacting with messages from other users and prevents the original poster associated with the previous message from interacting with the message, the message is a parent message and any response to the parent message is a child message, with the child message becoming the parent message in response to the respective subsequent users responding to the child message and not the parent message, and the one or more interfaces comprise a plurality of user interfaces, and each of the user interfaces correspond to specific users.

17. The computer system of claim 16, wherein the program instructions to determine a visibility metric associated with the received message comprise:

program instructions to determine a relation of the user to an originating user; and program instructions to identify a frequency of interaction between the user and the originating user.

18. The computer system of claim 17, wherein the program instructions stored on the one or more computer readable storage media further comprise:

program instructions to determine a sentiment associated with the message;

program instructions to classify the determined sentiment; and program instructions to determine a context associated with the determined sentiment.

19. The computer system of claim 18, wherein the program instructions stored on the one or more computer readable storage media further comprise:

program instructions to determine the visibility metric based on assigned weighted values assigned to each determination.

20. The computer system of claim 16, wherein the program instructions stored on the one or more computer readable storage media further comprise:

program instructions to limit interactions between a subsequent user and other subsequent users based on the determined visibility metric.

* * * * *